United States Patent
Sanchez et al.

(10) Patent No.: US 12,537,734 B2
(45) Date of Patent: Jan. 27, 2026

(54) OBSERVABILITY PLATFORM SERVICE FOR OPERATIONAL ENVIRONMENT

(71) Applicant: SAP SE, Walldorf (DE)

(72) Inventors: Anthony Sanchez, Burke, VA (US);
Gabor Kaszonyi, Budapest (HU);
Mario Eduardo Romero, Garcia (MX);
Gregory Melasecca, Newark, DE (US);
Yu Chen, Reston, VA (US); Shea Martens, Newtown Square, PA (US);
Jozsef Kertesz, Szekesfehervar (HU);
Vittalraya Shenoy Adige, Bangalore (IN); Yen Onn Hiu, Singapore (SG);
Petar Petrov, Budapest (HU); Balint Janos Toth, Mosonmagyarovar (HU);
Ismael Ruiz, Monterrey (MX)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/537,968

(22) Filed: Dec. 13, 2023

(65) Prior Publication Data
US 2025/0202760 A1    Jun. 19, 2025

(51) Int. Cl.
*H04L 41/0631* (2022.01)
*H04L 41/0654* (2022.01)
*H04L 41/0686* (2022.01)
*H04L 41/22* (2022.01)

(52) U.S. Cl.
CPC ...... *H04L 41/0631* (2013.01); *H04L 41/0654* (2013.01); *H04L 41/0686* (2013.01); *H04L 41/22* (2013.01)

(58) Field of Classification Search
CPC ............ H04L 41/0631; H04L 41/0654; H04L 41/0686; H04L 41/22
USPC ........................................................ 709/224
See application file for complete search history.

(56) References Cited

U.S. PATENT DOCUMENTS

| | | | |
|---|---|---|---|
| 8,843,563 B1 * | 9/2014 | Hartman | H04M 3/5183 709/206 |
| 9,916,194 B2 * | 3/2018 | Pang | G06F 11/34 |
| 11,924,027 B1 * | 3/2024 | Mysore | H04L 41/16 |
| 2009/0174561 A1 * | 7/2009 | Liu | H04B 10/272 340/578 |
| 2012/0072782 A1 * | 3/2012 | Hughes | H04L 12/6418 714/57 |
| 2012/0110087 A1 * | 5/2012 | Culver | G06F 16/95 709/205 |

(Continued)

*Primary Examiner* — David P Zarka
(74) *Attorney, Agent, or Firm* — Buckley, Maschoff & Talwalkar LLC

(57) ABSTRACT

Provided are systems and methods that facilitates cross-correlation among alerts within different systems in a complex operating environment. In one example, a method may include receiving a plurality of alert messages generated by a plurality of systems within a distributed and shared operating environment and storing the plurality of alert messages, identifying a subset of alert messages among the plurality of alert messages that are correlated based on relationships identified from the subset of alert messages, generating a description of a root cause of the subset of alert messages based on execution of an artificial intelligence (AI) model on the identified subset of alert messages, and displaying the description of the root cause via a user interface.

12 Claims, 10 Drawing Sheets

(56) References Cited

U.S. PATENT DOCUMENTS

| | | | | |
|---|---|---|---|---|
| 2017/0353991 | A1* | 12/2017 | Tapia | G06Q 10/20 |
| 2019/0166457 | A1* | 5/2019 | Lipowski | H04W 4/022 |
| 2019/0266514 | A1* | 8/2019 | Akella | G05B 23/0254 |
| 2019/0272725 | A1* | 9/2019 | Viklund | G16H 20/10 |
| 2020/0259700 | A1* | 8/2020 | Bhalla | H04L 41/16 |
| 2021/0351973 | A1* | 11/2021 | Ford | H04L 43/067 |
| 2022/0099532 | A1* | 3/2022 | Zhang | G05B 19/042 |
| 2022/0318082 | A1* | 10/2022 | Slinger | G06F 11/3409 |
| 2022/0337495 | A1* | 10/2022 | Safavi | H04L 43/16 |
| 2023/0179507 | A1* | 6/2023 | Maurice | H04W 24/06 |
| | | | | 709/224 |
| 2024/0007378 | A1* | 1/2024 | Zohoorian | H04W 72/0453 |
| 2024/0062888 | A1* | 2/2024 | De Hoogh | G16H 40/20 |
| 2024/0176878 | A1* | 5/2024 | Patankar | G06F 21/554 |
| 2024/0248150 | A1* | 7/2024 | Hecht | G05B 23/024 |
| 2024/0275662 | A1* | 8/2024 | Takada | H04L 41/0677 |

\* cited by examiner

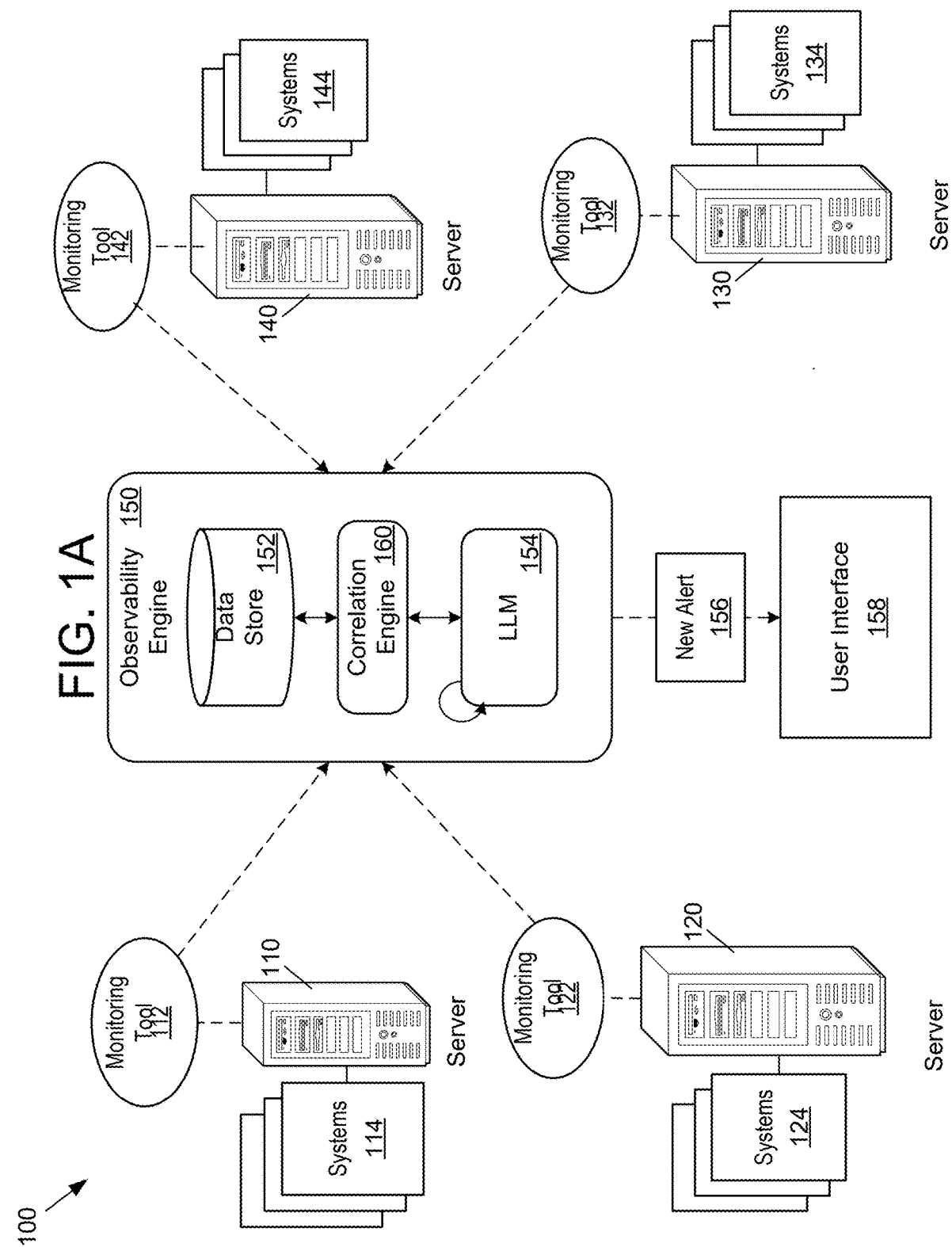

FIG. 2A

| Name | Message | System | Time |
|---|---|---|---|
| Colorado 2 | NPROD[COL]000107819[IBP-OD] KPV100JZH526 is Failed | My02_scmlbo1 | 2023-09-22 23:30:13 |
| Colorado 2 | NPROD[COL]000168074[IBP-OD] KP8-100-JZH526 is Failed | My5_scmlb71 | 2023-09-23 11:18:49 |
| Colorado 2 | NPROD[COL]000404664[IBP-OD] ZW-100-JZH526 is Failed | My7_scmlb71 | 2023-09-23 11:18:49 |
| Colorado 2 | Status is down for PROD[COL]000741325[IBP-OD] KTA-ZH421 | My36_scmlb21 | 2023-09-23 11:18:49 |
| Colorado 2 | Server rebooted: 8886Zr_33e used for CC IBP WVP (CS) | ccd24v2 | 2023-09-23 11:18:50 |
| Colorado 2 | Server rebooted: 1123X_bb187 used for CC IBP Z1Y (CS) | ccd216v3 | 2023-09-23 11:18:50 |
| Colorado 2 | Server rebooted: 9424Y_nb199 used for CC IBP TT3 (CS) | ccd22v24 | 2023-09-23 14:33:17 |
| Colorado 7 | File System Getting Full: Host 09424.ivr.css- filesystem / var/crash | ccd8v48 | 2023-09-23 14:33:17 |

| Name 202 | Message 204 | System 206 | Time 208 | |
|---|---|---|---|---|
| ~~Colorado 2~~ | NPROD[COL]000107819[IBP-OD] KPV100JZH526 is Failed | ~~My02_scmlbo1~~ | 2023-09-22 23:30:13 | 211 |
| Colorado 2 | NPROD[COL]000168074[IBP-OD] KP8-100-JZH526 is Failed | My5_scmlb71 | 2023-09-23 11:18:49 | 212 |
| Colorado 2 | NPROD[COL]000404664[IBP-OD] ZW-100-JZH526 is Failed | My7_scmlb71 | 2023-09-23 11:18:49 | 213 |
| Colorado 2 | Status is down for PROD[COL]000741325[IBP-OD] KTA-ZH421 | My36_scmlb21 | 2023-09-23 11:18:49 | 214 |
| Colorado 2 | Server rebooted: 8886Zr_33e used for CC IBP WVP (CS) | ccd24v2 | 2023-09-23 11:18:50 | 215 |
| Colorado 2 | Server rebooted: 1123X_bb187 used for CC IBP Z1Y (CS) | ccd216v3 | 2023-09-23 11:18:50 | 216 |
| Colorado 2 | Server rebooted: 9424Y_nb199 used for CC IBP TT3 (CS) | ccd22v24 | 2023-09-23 14:33:17 | 217 |
| ~~Colorado 7~~ | File System Getting Full: Host 09424.ivr.css- filesystem / var/crash | ~~ccd8v48~~ | 2023-09-23 14:33:17 | 218 |

Message Payload 230 | | | Context (Customers Affected) 220
---|---|---|---|---
212 | Colorado 2 | NPROD[COL]0001680174[IBP-OD] KP8-100-JZH526 is Failed | My5_scmlb71 | 2023-09-23 11:18:49 | Organization A
213 | Colorado 2 | NPROD[COL]0004046641[IBP-OD] ZW-100-JZH526 is Failed | My7_scmlb71 | 2023-09-23 11:18:49 | Organization B<br>Organization C
214 | Colorado 2 | Status is down for PROD[COL]000741325[IBP-OD] KTA-ZH421 | My36_scmlb21 | 2023-09-23 11:18:49 | Organization D
215 | Colorado 2 | Server rebooted: 8886Zr_33e used for CC IBP WVP (CS) | ccd24v2 | 2023-09-23 11:18:50 | Organization C<br>Organization D
216 | Colorado 2 | Server rebooted: 1123X_bb187 used for CC IBP Z1Y (CS) | ccd216v3 | 2023-09-23 11:18:50 | Organization A
217 | Colorado 2 | Server rebooted: 9424Y_nb199 used for CC IBP TT3 (CS) | ccd22v24 | 2023-09-23 14:33:17 | Organization B

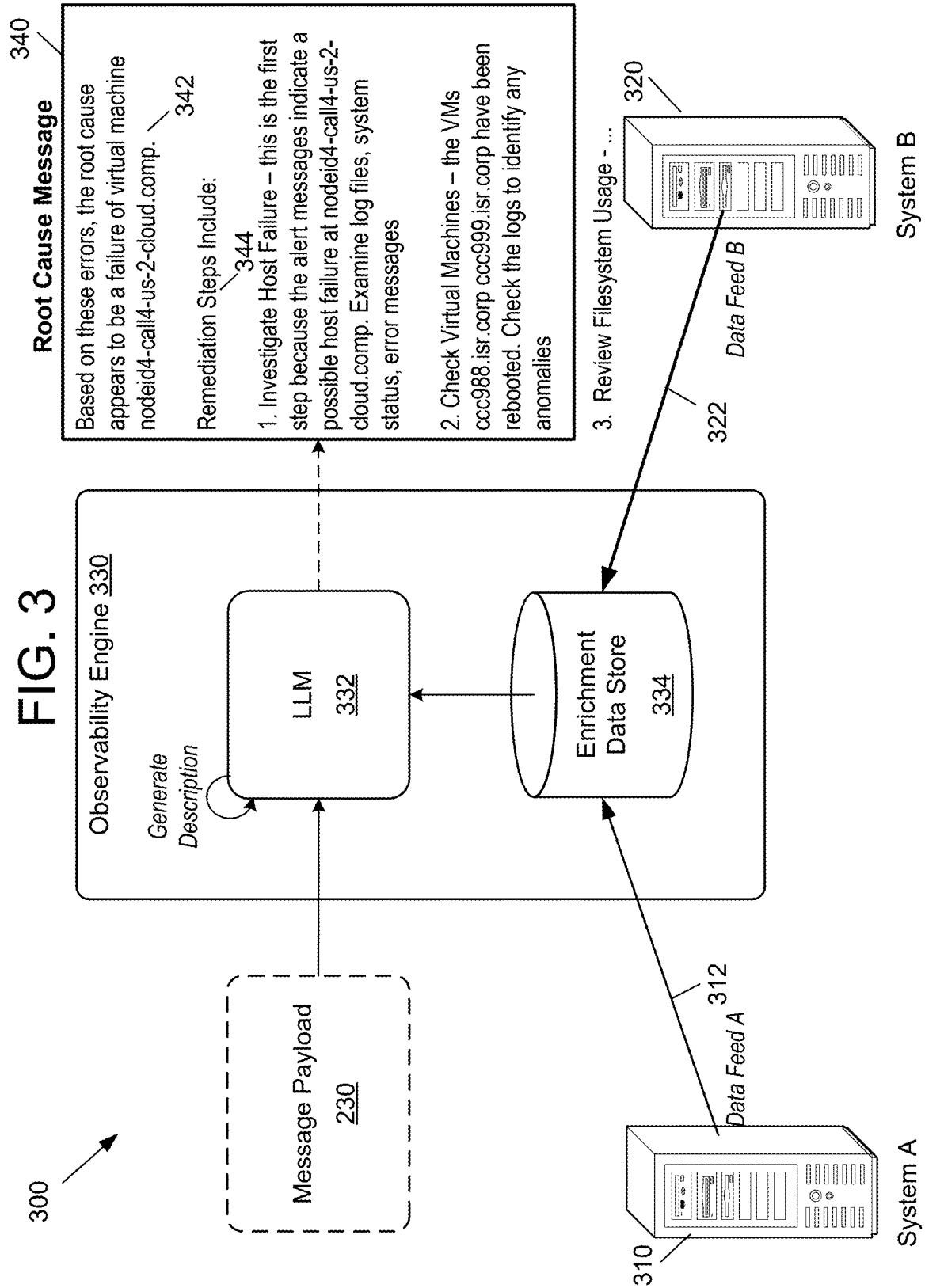

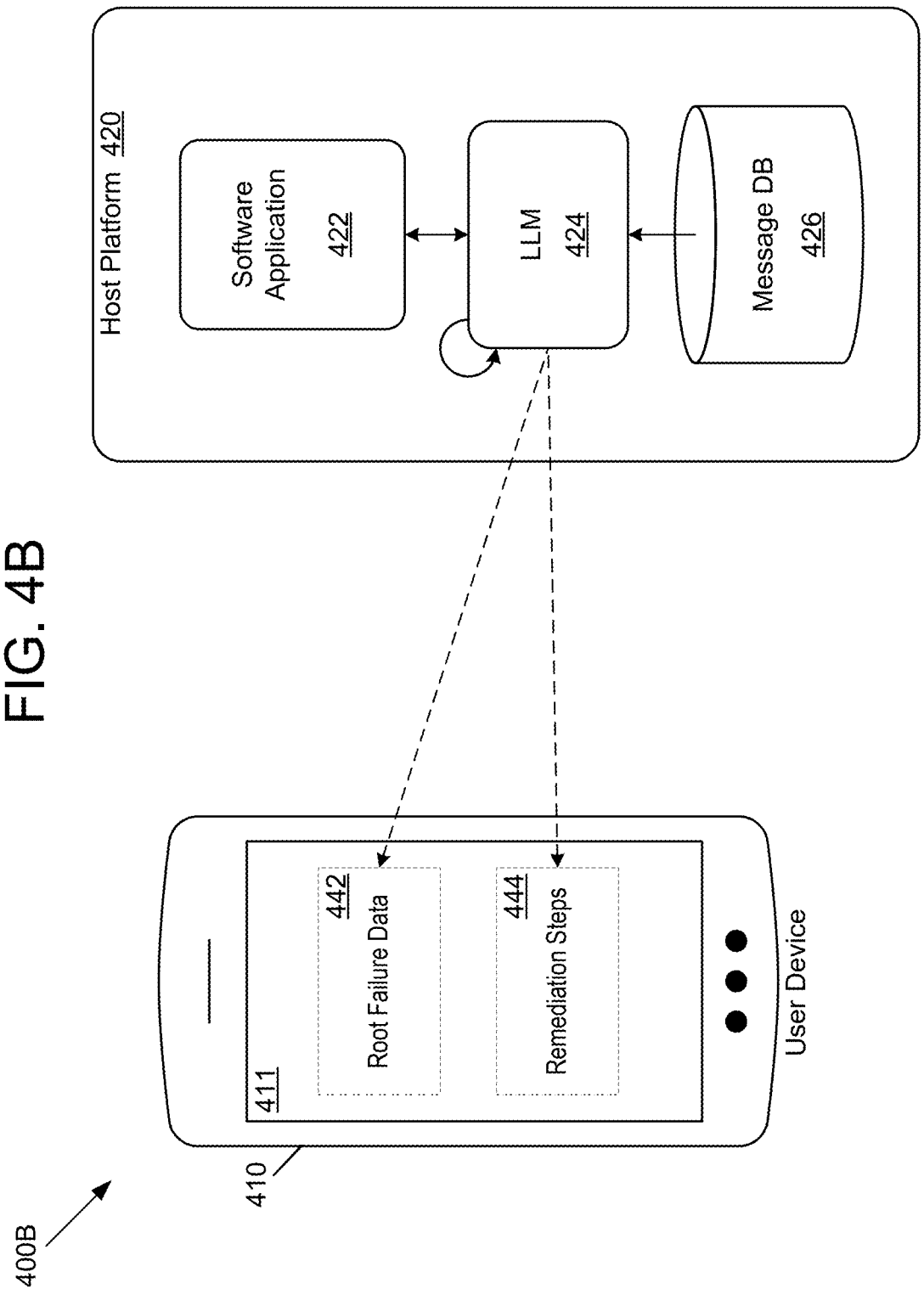

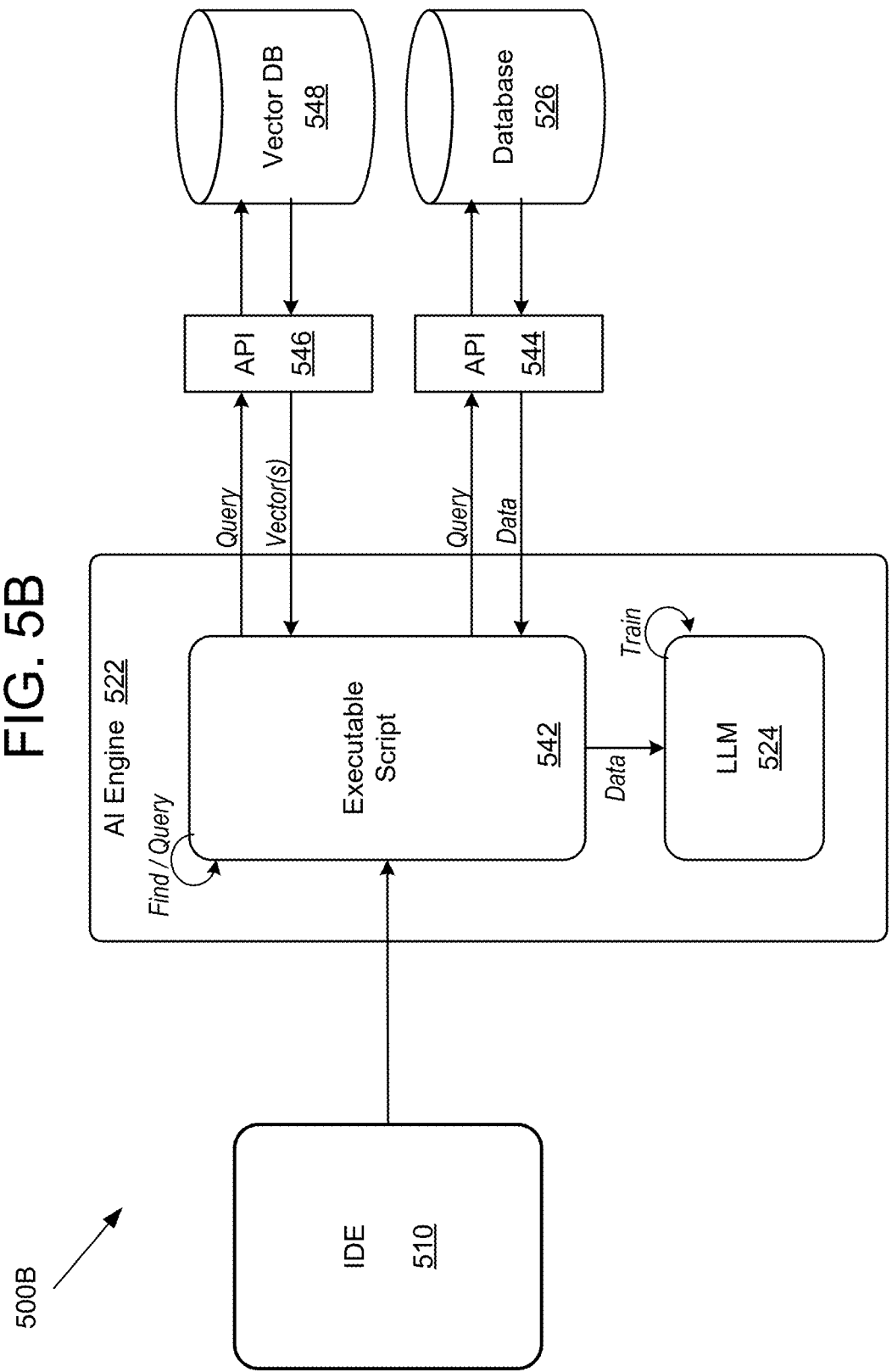

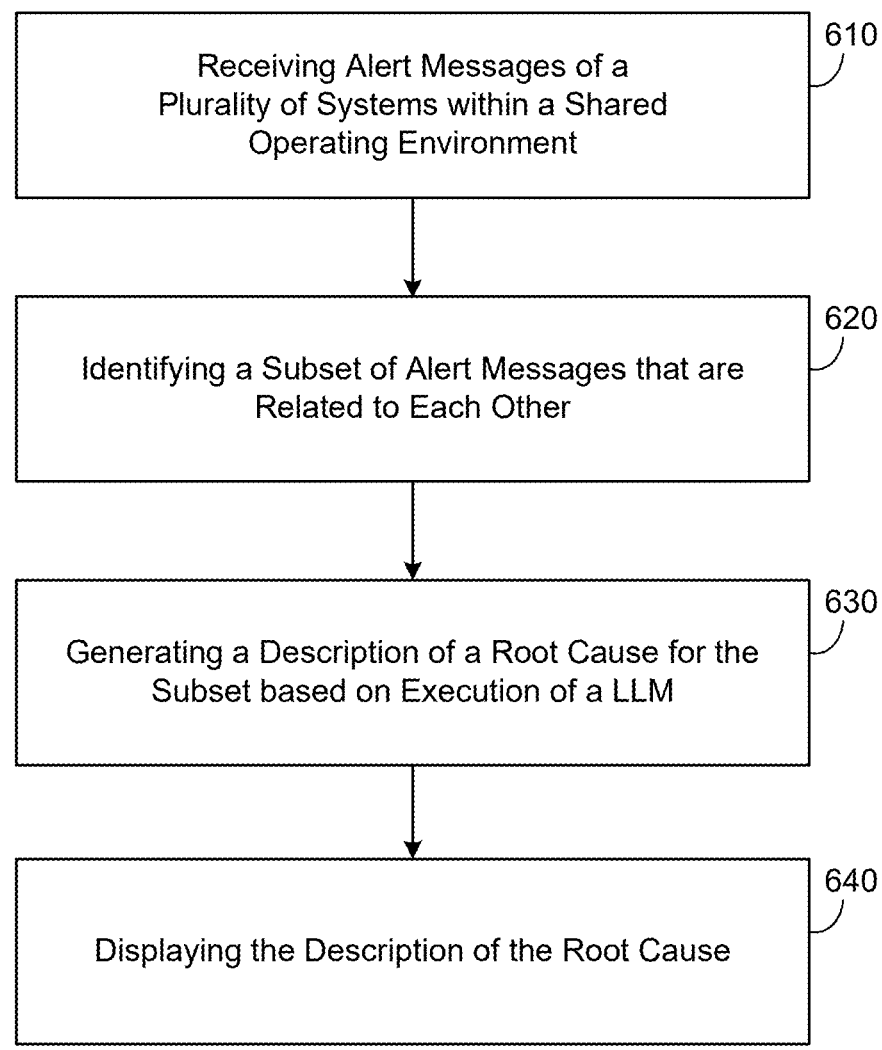

OBSERVABILITY PLATFORM SERVICE FOR OPERATIONAL ENVIRONMENT

BACKGROUND

In a complex operational environment with large WAN networks, datacenters, multiple software systems, data sources, software applications, technology stacks, monitoring tools, and the like, events can occur that lead to downtime and other issues. In some cases, an event can occur which creates alerts or other warnings across multiple different systems that rely on multiple different monitoring tools, respectively. In this situation, there is currently no easy way to correlate the alerts from these different and heterogeneous systems with traditional monitoring tools, particularly when the alerts are spread out across a shared operating environment with multiple operation teams. This is because current monitoring tools are fundamentally limited to linear alerts (one at a time) from a single stack and fail to correlate alerts across different stacks of technology (e.g., with different signal types, etc.). Additionally, current correlation engines are dependent on fully qualified signal data, which already contains the relevant configuration information to correlate the different systems and signals.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 1A is a diagram illustrating an observability engine that observes multiple monitoring systems in a complex environment in accordance with an example embodiment.

FIG. 1B is a diagram illustrating an example of a correlation service of the observability engine in accordance with example embodiments.

FIGS. 2A-2C are diagrams illustrating a process of identifying a subset of alerts that are related to each other in accordance with an example embodiment.

FIG. 3 is a diagram illustrating a process of generating a description of a root cause of an issue and mitigation steps for resolving the issue in accordance with an example embodiment.

FIGS. 4A-4B are diagrams illustrating a process of generating prompts that are input to a large language model in accordance with an example embodiment.

FIG. 5B is a diagram illustrating a process of executing a large language model in a live operating environment in accordance with an example embodiment.

FIG. 6 is a diagram illustrating a method of identifying a root cause of an issue that occurs across different systems in a complex environment in accordance with an example embodiment.

FIG. 7 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

Figure 4A:
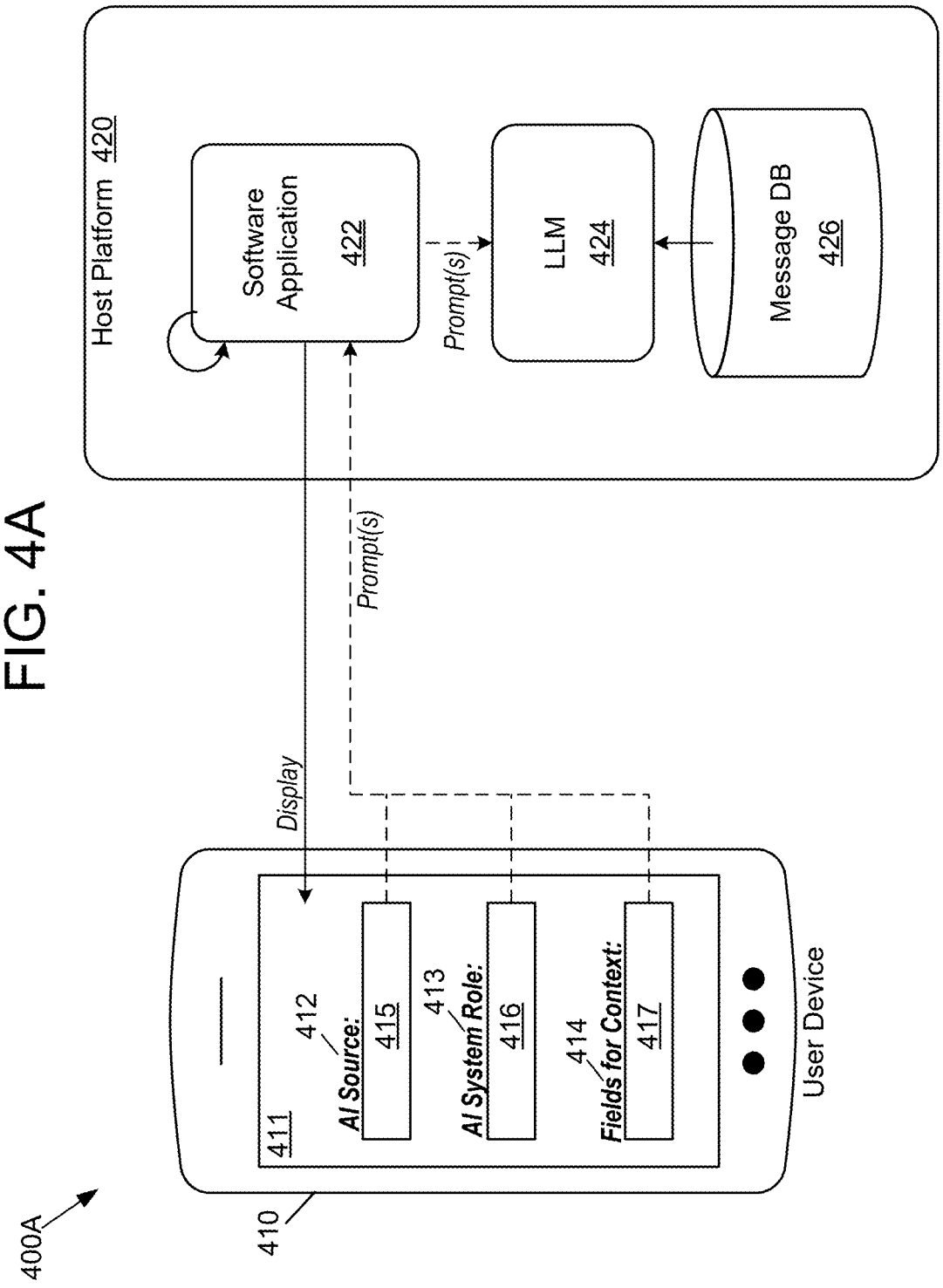

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Monitoring tools for monitoring computer systems within an enterprise shared operating environment are known. The monitoring tools may provide an overview of technical information about instances of a software program, a database, a host, or other technical asset. The monitoring tools may also generate metrics, traces, logs and events that can be viewed by a user to understand the performance of the system. As another example, the monitoring tools often provide drill-down capabilities for additional status information and metrics. However, monitoring tools are typically limited to a particular system or discipline (network, compute, storage, APM, etc). When the same issue affects multiple systems at the same time, present day monitoring tools struggle to identify the correlation between said systems and services. As a result, these issues are often handled separately (and by different operators or developers) creating inefficiency within the organization and extending Mean Time to Restore incidents (MTTR)

The example embodiments are directed to an observability engine that is configured to oversee a group of monitoring tools within a shared environment and identify correlated alerts that occur across different systems. In the example, embodiments, the shared environment may include a wide area network (WAN) of an enterprise with different systems that are heterogenous and managed by different operational teams of the enterprise. For example, the system may include servers, virtual machines, databases, routers, switches, load balancers, hypertext transfer protocol (HTTP) endpoints, data logs, storage nodes, models, and the like, which may each generate their own alerts. In this example, a first operational team may be responsible for overseeing and monitoring an application server that hosts software applications and a second operational team may be responsible for managing a database which stores application data for applications hosted by the server. Typically, these teams have a lack of transparency between them due to the different operational teams.

According to various embodiments, the observability engine may receive alerts from the different systems within the enterprise (such as those associated with different operational teams within an organization), and identify a subset of the alerts that are related to each other (i.e., correlated). The observability engine may analyze the related alerts, identify a single root cause for the related alerts, and generate an all-encompassing alert that identifies the root cause.

The observability engine may be referred to herein as a Monitor of Monitors (MoM). Different monitoring tools may monitor over the different systems and sub-systems within a distributed and shared operating environment of the enterprise and transmit alert messages to the observability engine described herein. The operating environment may include multiple operational teams that are responsibility for different parts of the system in a distributed manner. The observability engine may analyze the alerts and identify when multiple alerts across multiple systems are associated with the same root cause. Furthermore, the observability engine may determine how the correlated alerts impact other systems within the enterprise.

According to various embodiments, the observability engine may analyze attributes within the alert messages themselves, metadata of the alert messages, object/service relationships and the like, to identify a smaller subset of messages that are related to one another such as a small subset of issues related to a specific issue within the enterprise and down to even a particular physical host or device. The observability engine may analyze attributes such as timestamps (e.g., time of impact, etc.), geographic locations, virtual machine locations, routers, switches, load balancers, server locations, and the like, within the messages to identify related alerts, and also inject additional contextual data into the received alerts. The observability engine may transform the enriched alerts into usable data objects such as vectors, etc., which can be input to an artificial intelligence model or the like. For example, the observability engine may determine a potential root cause of the related alerts and recommend steps for mitigating the issues by executing an artificial intelligence model, such as an artificial intelligence (AI) model, a large-language model (LLM), and generative artificial intelligence model, or the like, on the transformed alerts and generate a new alert which includes a description of the root cause (with all the correlated alerts). That is, the new alert may include a description of a root cause that describes the cause of all of the correlated alerts thus improving the ability of the system to identify issues that spread across multiple systems within the distributed and shared operating environment.

In some embodiments, the observability engine may also interact with other systems within the data center to enrich or otherwise inject custom data from the different systems. For example, one or more systems within the data center may provide data feeds with context about the environment such as what customers (e.g., what organizations) have their data held on which servers at the data center. This context can also be input to the artificial intelligence model and used by the artificial intelligence model to determine the root cause. Furthermore, in some embodiments, the model may query a user for additional information about the system using prompts and responses to the prompts. The prompts and the responses to the prompts can also be used to determine the root cause.

The observability engine may include an alerting framework which allows the observability engine to transmit alert messages to a workflow engine or other automation tool in the form of code (e.g., vectors, etc.) thereby enabling the alert messages to be input directly into the artificial intelligence model because the data is already in a form that is readable/understandable to a computer processor. The alert messages received through the alerting framework may be input to an artificial intelligence model such as a large language model (LLM), transformer neural network, or the like. The model may generate a new alert that contextualizes the related underlying issue (e.g., the root cause) that caused the different systems to generate the alert messages.

FIG. 1A illustrates a distributed and shared operational environment 100 with multiple monitoring systems in accordance with an example embodiment. For example, FIG. 1A may be illustrative of a complex operational environment which includes multiple infrastructures and servers including a server 110, a server 120, a server 130, and a server 140. Here, each of the servers has their own monitoring tool associated therewith and running therein. In addition, each of the servers hosts their own respective systems. These different systems may be distributed throughout the same data center or even distributed across different geographic locations.

In this example, the server 110 includes a monitoring tool 112 and systems 114, the server 120 includes a monitoring tool 122 and systems 124, the server 130 includes a monitoring tool 132 and systems 134, and the server 140 includes a monitoring tool 142 and systems 144. Each of the respective monitoring tools may monitor for possible issues within the respective systems where they are hosted for issues such as site downtime, storage capacity, server outage, and other issues that can occur therein. The monitoring tools may be the same for some objects and different for other objects based on types, etc. Furthermore, when issues are detected, the monitoring tools may generate and send alert messages to an observability engine 150. In some embodiments, the alert messages may be vectorized or they may be in a different form such as plain text, etc. The observability engine 150 may receive the alert messages and store them within a data store 152 thereof.

According to various embodiments, the observability engine 150 may identify a subset of alerts that are related to one another based on attributes within the alert messages via a correlation engine 160. For example, the correlation engine 160 may identify overlapping attribute values such as attribute values for geographic location, time of occurrence, server name, and the like, within the related messages. The subset of identified alert messages may also be enriched with additional context from additional systems (not shown) that provide the alert messages with additional information about the organizations that are hosted by each server.

The subset of alert messages, and any enrichment data, may be input to a large language model (LLM) which is configured to determine a root cause of the subset of alert messages, steps to triage and/or mitigate the root cause, customers impacted, and the like. In response, the observability engine 150 may generate a new alert 156 which is output to a user interface 158. The new alert 156 may include a contextualized alert with a root cause description generated by the LLM 154 based on an aggregation of the alert messages performed by the correlation engine 160. The new alert 156 may provide an update to an existing alert, a wider understanding of the problem beyond just what an individual system is able to see, and/or the like. As such, a user does not need to try and deconstruct the problem on their own.

FIG. 1B is a diagram illustrating an example of a correlation service of the observability engine in accordance with example embodiments. FIG. 1B illustrates an example of the observability engine 150 in communication with the correlation engine 160 shown in FIG. 1A. In this example, the observability engine 150 can access various APIs within the correlation engine 160 such as an alerting service API 161, a graph API 162, a prompt engineering API 163, a correlation API 164, and a data store 165, within the correlation engine 160. The graph API 162 contains access to a business data graph that includes relationships between alerts and services that are identified from the graph API 162.

For example, the graph API 162 may contain nodes that represent data entities such as a customer, a supplier, a product, a sale, a purchase order, a general ledger, and the like. The nodes are connected to each other through edges that identify relationships. The graph API 162 may contain associations therein (i.e., edges) between the nodes which identify relationships between the business objects. With this, the graph API 162 can be used to identify business objects that are related to each other and that are associated with different alerts. Here, the business data graph may include edges between nodes (e.g., business objects) that are related for purposes of alerting. Thus, the graph API 162 can be queries for relationships and associations between alerts that are received by the observability engine 150.

FIGS. 2A-2C illustrate a process of identifying a subset of alerts that are related to each other in accordance with an example embodiment. The process may be carried out by the observability engine 150 shown in the example of FIG. 1A. For example, FIG. 2A illustrates a user interface 200A that depicts a plurality of alert messages that have been received from eight different systems within a shared environment. Each alert message includes an identifier of a location 202 where the issue is detected, a message body 204 that describes the issue, a system identifier 206 of the server where the issue is detected, and a timestamp 208 that identifies a time of impact of the issue.

Through the course of a day there may be dozens or even hundreds (thousands and more) of alert messages that are provided to the observability engine. Here, the observability engine may identify a subset of alert messages that are related to each other by comparing attributes associated with the alert messages including timestamps, geographic locations, and the like. For example, FIG. 2B illustrates a process 200B of identifying a subset of alert messages that are related to the same issue from among a larger set of alert messages provided to the observability engine.

For example, the observability engine may determine that a subset of alert messages 212, 213, 214, 215, 216, and 217 are related to each other based on attributes within and/or metadata of the subset of alert messages 212, 213, 214, 215, 216, and 217. For example, service inventory and a dependency graph may be used to correlate alerts contextually such as based on the context of an order and a location of the target customer of the order. As another example, overlapping values such as overlapping timestamps (or very similar timestamps), overlapping geographic locations, server names, etc.) may be used to identify related alert messages. Furthermore, the observability engine may determine that alert message 211 and 218 are not related to the subset of alert messages 212, 213, 214, 215, 216, and 217, based on a comparison of attributes between the alert message 211 and the alert message 218, with respect to the attributes within the subset of alert messages 212, 213, 214, 215, 216, and 217.

According to various embodiments, the observability engine may remove or otherwise prune the unrelated alert messages including the alert message 211 and the alert message 218, etc., from the correlated messages and input only the subset of alert messages that appear to be associated with the same underlying issue into the LLM. Furthermore, the subset of alert messages 212, 213, 214, 215, 216, and 217 may be added to a message payload 230 as shown in a process 200C within the example of FIG. 2C. In this example, each alert message within the subset of alert messages 212, 213, 214, 215, 216, and 217 is enriched with an additional attribute value 220 that identifies the customers that are serviced by the data center at those locations (i.e., the customers affected by the issues). The enrichment of the data may be performed by the observability engine 150 based on data feeds from other systems/heterogeneous systems within the shared environment.

FIG. 3 illustrates a process 300 of generating a description of a root cause of a cross-system issue and mitigation steps for resolving the issue in accordance with an example embodiment. Referring to FIG. 3, an observability engine 330 (such as the observability engine 150 shown in FIG. 1A) includes a LLM 332 and a data store 334 of enriched data records from a plurality of feeds of data including a feed 312 from a first data system 310 within a distributed and shared operating environment and a feed 322 from a second data system 320 within the shared operating environment. The feed 322 may identify contextual data about the systems within the shared operating environment including the systems which are sending the alert messages. The context may include identifiers of customers (e.g., names of organizations, etc.) which have software, data, etc. managed by a specific system that is impacted by the issue, and the like.

According to various embodiments, the message payload 230 generated in the process 200C of FIG. 2C may be fed as an input into the LLM 332. Although not required, the LLM 332 may receive additional inputs such as contextual data from one or more of the feed 322 and the feed 312 within the shared operating environment. In this example, the LLM 332 receives the message payload 230 and the feed 312 and the feed 322, and determines a root cause of an issue that is causing the correlated alert messages within the message payload 230.

For example, the LLM 332 may be trained to identify related issues among different systems learning patterns between cross-correlated issues that affect multiple systems within the shared operating environment. For example, the LLM 332 may be trained on historical alert messages from a first system within the environment and historical alert messages of one or more different systems within the environment which have previously been identified as being related to one another based on root cause. Through the training, the LLM 332 may learn to identify the root cause of a plurality of messages that have been grouped together.

In the example of FIG. 3, the LLM 332 determines a root cause 342 of the issue and also remediation steps 344 that can be used by a technician or other entity to triage or otherwise mitigate the issue that is causing the alerts. Here, the LLM 332 generates a new alert 340 with a description of the root cause 342 and a description of the remediation steps 344. The root cause 342 may include an identifier of a system (or systems) where the issue is present including, but not limited to, one or more computer servers, one or more virtual machines, one or more software applications, one or more APIs, one or more infrastructures, a combination thereof, and/or the like. Furthermore, the root cause 342 may also identify a type of issue such as a system failure, a system reboot, a storage running out, etc.

The remediation steps 344 may include a description of actions, such as a sequence of steps which can be taken by a person and an order in which they should be taken to address the root cause of the issue. In some embodiments, the remediation steps 344 may describe the steps necessary to fix the issue. As another example, the remediation steps 344 may include steps that instruct the user on how to begin inspecting the issue to arrive at a possible course of actions. The remediation steps 344 may also be determined by the LLM 332 based on its training. For example, the LLM 332 may be trained based on previous root causes and steps that were taken to successfully address those root causes. Through the training, the LLM 332 can learn to generate remediation steps 344 for a newly generated alert message.

Some of the benefits of the observability engine described herein include the ability of the system to generate a multi-system correlation across different types of systems based on service relationships. The service relationships can be identified based on service data stored within operating environment including customer names, tenant information, application URLs, infrastructure components, and the like. The system also enriches the original data with feeds of data from other systems in the environment thereby providing additional context that can be used to further understand the alerts being generated by other systems within the shared environment. Furthermore, the alerting framework enables alerts to be sent as code across multiple configurations with logic that is based on object and service relationships. The system can analyze of broad range of alert messages from many different systems and identify logical related alert messages based on shared/overlapping attributes such as geographic location, timestamps, and the like.

Furthermore, according to various embodiments, the observability engine takes the contextualized and grounded data that has been obtained from both the monitoring tools and the systems within the shared operating environment and inputs them to a generative artificial intelligence model (e.g., an LLM, neural network, etc.) to generate root cause indicators and create triage guidance in an agnostic way that is transportable to any technical destination. This new alert takes into consideration a group of alert messages and provides an overview of the group as a whole including a root cause of the group of alert messages, even across multiple technology stacks.

In some embodiments, the generative artificial intelligence model may use prompts (i.e., short pieces of text input to the generative AI model) to further understand the operating environment and determine the root cause and/or triage steps. For example, FIGS. 4A-4B illustrate a process of generating prompts that are input to a large language model in accordance with an example embodiment. For example, FIG. 4A illustrates a process 400A of a software application 422 displaying a plurality of requests for information on a user interface 411 of a user device 410. The software application 422 is hosted by a host platform 420 such as a cloud platform, web server, or other host environment, and may include or may be the observability engine 150 shown in FIG. 1A, but embodiments are not limited thereto.

Here, the software application 422 displays three requests for data on the user interface 411 of the user device 410 including a request for information 412, a request for information 413, and a request for information 414. Each of the requests identifies a type of information to be input by a user. The software application 422 also displays three input fields including an input field 415 for receiving an input with respect to the request for information 412, an input field 416 for receiving an input with respect to the request for information 413, and an input field 417 for receiving an input with respect to the request for information 414. A user may enter information into the input fields and press a button on the user interface 411 causing the input information to be sent to a LLM 424 as prompts.

Each prompt may include both the text content from the request paired with the response entered by the user. For example, if the user inputs the names of three fields of data into the input field 417, the names of the three fields of data along with the request for information 414 may be sent to the LLM 424 as a prompt. Here, the prompt would include the text content from the names of the three fields and the text content "Fields for Context" from the user interface 411. The LLM 424 may use a subset of related messages from a message database 426 (e.g., a message payload of alert messages such as the message payload 230 shown in FIG. 2C, etc.) and the prompts to determine the root cause of an issue and also to determine remediation steps. For example, FIG. 4B illustrates a process 400B of the LLM 424 generating a description of a root cause 442 and a description of remediation steps 444 and displaying both the description of the root cause 442 and the description of the remediation steps 444 on the user interface 411 of the user device 410.

In some embodiments, the LLM 424 may be trained based on predefined prompts. The prompts may be used as instructions for the LLM 424 to guide the LLM 424 in determined the root cause. Furthermore, in some embodiments, the software application 422 may deliberately add waiting times between submitting prompts to the LLM 424 to ensure that the model has enough time to think about the answer. The waiting times may be integrated into the code of the software application 422 or they may be modified/configured via a user interface. Furthermore, the ordering of the prompts and the follow-up questions that are asked may be different depending on the answers given during the previous prompt or prompts.

Figure 5A:
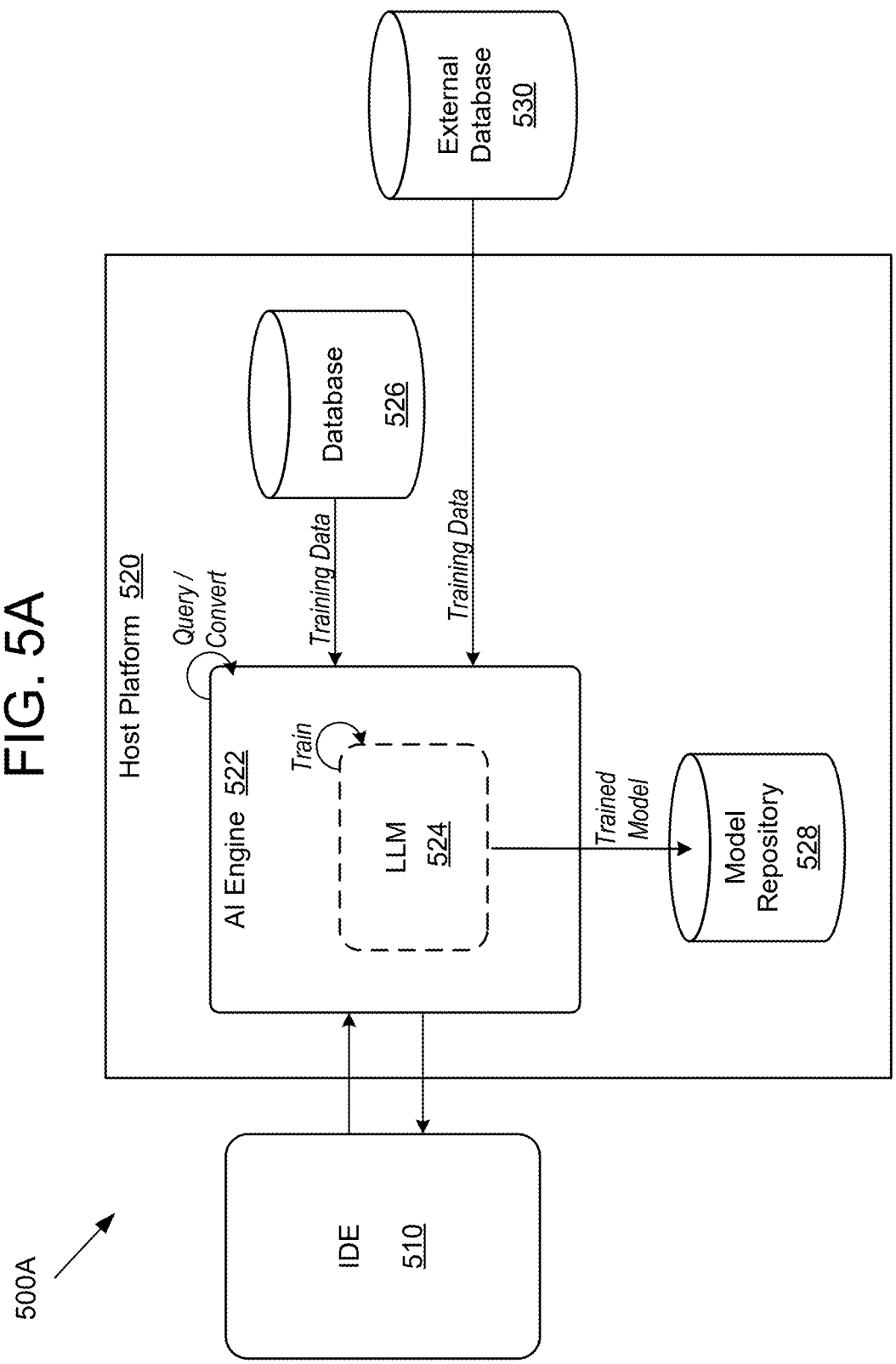
FIG. 5A is a diagram illustrating a process of training a large language model in accordance with an example embodiment.

FIG. 5A illustrates a process 500A of training a large language model 524 in accordance with an example embodiment, and FIG. 5B illustrates a process 500B of executing the large language model 524 in a live operating environment in accordance with an example embodiment. Referring to FIG. 5A, a host platform 520 may host an IDE 510 (integrated development environment) where models may be trained such as AI models and machine learning models. In this example, the IDE 510 may include a software application with a user interface accessible by a user device over a network or through a local connection. For example, the IDE 510 may be embodied as a web application that can be accessed at a network address, URL, etc. by a device. As another example, the IDE 510 may be locally or remotely installed on a computing device used by a user.

The IDE 510 may be used to design a model (via a user interface of the IDE), such as a generative artificial intelligence model that can receive text as input and generate custom imagery, text, etc. which can be displayed on a user interface/dashboard of a software application that displays content during meetings between user devices. The model can be executed/trained based on the training data established via the user interface. For example, the user interface may be used to build a new model. The training data for training such a new model may be provided from a training data store such as a database 526 which includes training samples from historical alert messages, remediation steps, and the like. As another example, the training data may be pulled from one or more external data stores 530 such as publicly available sites that provide samples of alert messages, remediation steps, etc.

During training, the large language model 524 may be executed on training data via an AI engine 522 of the host platform 520. The training data may include a large corpus of alert messages and cross-correlated issues that have previously been determined within those alert messages. In some embodiments, the AI engine 522 may convert text content within the alert messages into vector form before feeding the alerts into the large language model 524. As another example, the alert message may be received from the monitoring tools already in vector form. Through the training process, the large language model 524 may learn mappings/connections between alert messages from different systems and shared root causes of these related alert messages. When the model is fully trained, it may be stored within a model repository 528 via the IDE 510, or the like.

As another example, the IDE 510 may be used to retrain the large language model 524 after the model has already been deployed. Here, the training process may use executional results that have already been generated/output by the large language model 524 in a live environment (including user feedback, etc.) to retrain the large language model 524. For example, predicted root causes may be indicated as correct or not by a service technician. Both the predicted root cause and the feedback may be used to retrain the large language model 524. This data may be captured and stored within a runtime log or other data store within the live environment and can be subsequently used to retrain the large language model 524.

The process that is performed in FIG. 5A may also include an evaluation of the outputs made by the large language model 524 to determine an accuracy of the large language model 524. The process may be performed each time a training iteration is performed, or it may be performed separately. Furthermore, the training process may be iteratively repeated until the human in the loop ends the process or a predetermined level of predictive accuracy has been achieved.

Referring now to FIG. 5B, the AI engine 522 also hosts a script 542 which can read live execution data from a database 526 and input the data to the large language model 524 while the large language model 524 is running/executing via the AI engine 522. For example, the script 542 may use an identifier of a data location (e.g., table IDs, row IDs, column IDs, topic IDs, object IDs, etc.) encoded therein or from a lookup table to identify locations of the training data within data stores. For example, in FIG. 5B, the script 542 may query the database 526 via an API 544 for data that can be used to correlate different messages from different systems. In response, the database 526 may receive the query, load the requested data, and return it to the AI engine 522 where it is input to the large language model 524. As another example, the script 542 may query a database 548 via an API 546 for procedures and other vectorized information that can be input to the large language model 524 for domain-specific purposes. The process may be managed via a user interface of the IDE 510 which enables a human-in-the loop during the training process (supervised learning). However, it should also be appreciated that the system is capable of unsupervised learning as well.

FIG. 6 illustrates a method 600 of identifying a root cause of an issue that occurs across different systems in a complex environment in accordance with an example embodiment. For example, the method 600 may be performed by a host platform such as a server, a cloud platform, a user device, a software program, a combination thereof, and the like. Referring to FIG. 6, in 610, the method may include receiving a plurality of alert messages generated by a plurality of systems within a shared operating environment and storing the plurality of alert messages in a storage. In 620, the method may include identifying a subset of alert messages among the plurality of alert messages that are related to each other based on values included within the subset of alert messages. In 630, the method may include generating a description of a root cause of the subset of alert messages based on execution of an artificial intelligence (AI) model on the identified subset of alert messages. In 640, the method may include displaying the description of the root cause via a user interface.

In some embodiments, the identifying may include identifying the subset of alert messages that are related to each other based on timestamps of the subset of alert messages. In some embodiments, the receiving may include receiving the plurality of alert messages from a plurality of heterogeneous systems, respectively, within an operating environment of a data center. In some embodiments, the generating may include executing a large language model (LLM) on the subset of alert messages to determine the root cause of the subset of alert messages and to generate the description of the root cause. In some embodiments, the method may further include displaying a request for information via the user interface and receiving a response to the request for information via the user interface, and the generating comprises generating the description of the root cause based on execution of the AI model on the question and the response to the question.

In some embodiments, the method may further include enriching the plurality of alert messages with additional context of the shared operating environment based on one or more data feeds, prior to execution of the AI model. In some embodiments, the method may further include determining an area of impact within the shared operating environment based on execution of the AI model on the subset of identified alert messages, and displaying a map of the shared operating environment including the area of impact via the user interface. In some embodiments, the method may further include generating a description of a strategy for triaging the root cause based on execution of the AI model on the subset of identified alert messages, and displaying the description of the strategy via the user interface.

FIG. 7 illustrates a computing system 700 that may be used in any of the methods and processes described herein, in accordance with an example embodiment. For example, the computing system 700 may be a database node, a server, a cloud platform, or the like. In some embodiments, the computing system 700 may be distributed across multiple computing devices such as multiple server nodes. Referring to FIG. 7, the computing system 700 includes a network interface 710, a processor 720, an input/output 730, and a storage 740 such as an in-memory storage, and the like. Although not shown in FIG. 7, the computing system 700 may also include or be electronically connected to other components such as a display, an input unit(s), a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The input/output 730 may include an interface, a port, a cable, a bus, a board, a wire, and the like, for inputting and outputting data to and from the computing system 700. For example, data may be output to an embedded display of the computing system 700, an externally connected display, a display connected to the cloud, another device, and the like. The network interface 710, the input/output 730, the storage 740, or a combination thereof, may interact with applications executing on other devices.

The storage 740 is not limited to a particular storage device and may include any known memory device such as RAM, ROM, hard disk, and the like, and may or may not be included within a database system, a cloud environment, a web server, or the like. The storage 740 may store software modules or other instructions which can be executed by the processor 720 to perform the methods described herein. According to various embodiments, the storage 740 may include a data store having a plurality of tables, records, partitions and sub-partitions. The storage 740 may be used to store database records, documents, entries, and the like.

As one example, the processor 720 may receive a plurality of alert messages generated by a plurality of systems within a shared operating environment and store the plurality of alert messages in the storage. Furthermore, the processor 720 may identify a subset of alert messages in the storage that are related to each other based on values included within the subset of alert messages. In addition, the processor 720 may generate a description of an underlying root cause of the subset of alert messages based on execution of an artificial intelligence (AI) model on the identified subset of alert messages. Furthermore, the processor 720 may display the description of the root cause via a user interface.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), cloud storage, and the like.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a storage; and
   a processor configured to:
      receive a plurality of alert messages generated by a plurality of systems within a distributed and shared operating environment and store the plurality of alert messages in the storage, each individual alert message of the plurality of alert messages including an identifier of a location where a performance issue for at least one of the plurality of systems has been detected and an identity of a server where the performance issue was detected;
      identify a subset of alert messages in the storage that are correlated based at least in part on attributes within the alert messages, the attributes indicating one or more of: geographic locations, virtual machine locations, routers, switches, load balancers, or server locations identified from the subset of the alert messages;
      execute a large language model (LLM) on the subset of alert messages;
      generate a request for information based on the execution of the LLM on the subset of the alert messages, display the request for information via the user interface, receive a response to the request for information via the user interface, and determine a description of the root cause based on execution of the LLM on the request for information and the response to the request for information; and
      display the description of the root cause via a user interface.

2. The computing system of claim 1, wherein the processor is configured to receive the plurality of the alert messages from a plurality of heterogeneous systems, respectively, within an operating environment of a wide area network (WAN).

3. The computing system of claim 1, wherein the processor is further configured to enrich the plurality of alert messages with additional context of the distributed and shared operating environment based on one or more data feeds, prior to the execution of the LLM.

4. The computing system of claim 1, wherein the processor is further configured to determine an area of impact within the distributed and shared operating environment based on execution of the LLM on the subset of the alert messages, and display a map of the distributed and shared operating environment including the area of impact via the user interface.

5. The computing system of claim 1, wherein the processor is further configured to generate a description of a strategy for triaging the root cause based on execution of the LLM on the subset of the alert messages, and display the description of the strategy via the user interface.

6. A method comprising:
   receiving a plurality of alert messages generated by a plurality of systems within a distributed and shared operating environment and storing the plurality of alert messages, each individual alert message of the plurality of alert messages including an identifier of a location where a performance issue for at least one of the plurality of systems has been detected and an identity of a server where the performance issue was detected;
   identifying a subset of alert messages among the plurality of alert messages that are correlated based at least in part on attributes within the alert messages, the attributes indicating one or more of: geographic locations, virtual machine locations, routers, switches, load balancers, or server locations identified from the subset of the alert messages;

executing a large language model (LLM) on the subset of alert messages;

generating a request for information based on the execution of the LLM on the subset of the alert messages, display the request for information via the user interface, receive a response to the request for information via the user interface, and determining a description of the root cause based on execution of the LLM on the request for information and the response to the request for information; and displaying the description of the root cause via a user interface.

7. The method of claim 6, wherein the receiving comprises receiving the plurality of alert messages from a plurality of heterogeneous systems, respectively, within an operating environment of a wide area network (WAN).

8. The method of claim 6, wherein the method further comprises enriching the plurality of alert messages with additional context of the distributed and shared operating environment based on one or more data feeds, prior to the execution of the LLM.

9. The method of claim 6, wherein the method further comprises determining an area of impact within the distributed and shared operating environment based on execution of the LLM on the subset of the alert messages, and displaying a map of the distributed and shared operating environment including the area of impact via the user interface.

10. The method of claim 6, wherein the method further comprises generating a description of a strategy for triaging the root cause based on execution of the LLM on the subset of the alert messages, and displaying the description of the strategy via the user interface.

11. A non-transitory computer-readable storage medium comprising instructions which when executed by a processor cause a computer to perform:

receiving a plurality of alert messages generated by a plurality of systems within a distributed and shared operating environment and storing the plurality of alert messages, each individual alert message of the plurality of alert messages including an identifier of a location where a performance issue for at least one of the plurality of systems has been detected and an identity of a server where the performance issue was detected;

identifying a subset of alert messages among the plurality of alert messages that are correlated based at least in part on attributes within the alert messages, the attributes indicating one or more of: geographic locations, virtual machine locations, routers, switches, load balancers, or server locations identified from the subset of the alert messages;

executing a large language model (LLM) on the subset of alert messages;

generating a request for information based on the execution of the LLM on the subset of the alert messages, display the request for information via the user interface, receive a response to the request for information via the user interface, and determining a description of the root cause based on execution of the LLM on the request for information and the response to the request for information; and displaying the description of the root cause via a user interface.

12. The non-transitory computer-readable storage medium of claim 11, wherein the receiving comprises receiving the plurality of the alert messages from a plurality of heterogeneous systems, respectively, within an operating environment of a wide area network (WAN).

* * * * *